United States Patent
Hong

(10) Patent No.: US 9,473,008 B2
(45) Date of Patent: Oct. 18, 2016

(54) LINEAR VIBRATION MOTOR WITH PROTRUSION BLOCKING SOLDER ATTACHING PRINTED CIRCUIT BOARD TO CASE

(71) Applicant: SAMSUNG ELECTRO-MECHANICS CO., LTD., Suwon (KR)

(72) Inventor: Jung Taek Hong, Suwon (KR)

(73) Assignee: MPLUS CO., LTD., Suwon-Si, Gyeonggi-Do (KR)

(*) Notice: Subject to any disclaimer, the term of this patent is extended or adjusted under 35 U.S.C. 154(b) by 780 days.

(21) Appl. No.: 13/899,847

(22) Filed: May 22, 2013

(65) Prior Publication Data
US 2014/0001889 A1    Jan. 2, 2014

(30) Foreign Application Priority Data
Jun. 29, 2012    (KR) .................. 10-2012-0070932

(51) Int. Cl.
| | |
|---|---|
| *H02K 33/18* | (2006.01) |
| *H02K 5/24* | (2006.01) |
| *H02K 41/035* | (2006.01) |
| *B23K 37/06* | (2006.01) |
| *B06B 1/04* | (2006.01) |
| *H02K 1/34* | (2006.01) |

(52) U.S. Cl.
CPC ............... *H02K 33/18* (2013.01); *B06B 1/045* (2013.01); *B23K 37/06* (2013.01); *H02K 5/24* (2013.01); *H02K 41/0354* (2013.01); *H02K 1/34* (2013.01); *H02K 2203/03* (2013.01)

(58) Field of Classification Search
CPC .... H02K 5/24; H02K 33/18; H02K 41/0354; H02K 1/34; B06B 1/045; B06B 1/04; B23K 1/00206; B23K 3/00–3/087; H01L 2224/03013; H01L 2224/11013; H01L 2224/27013
USPC .......................................................... 310/25
See application file for complete search history.

(56) References Cited

U.S. PATENT DOCUMENTS

2005/0184601 A1    8/2005    Kweon et al.

FOREIGN PATENT DOCUMENTS

| KR | 10-2006-0090399 | 8/2006 |
|---|---|---|
| KR | 10-1055508 | 8/2011 |

OTHER PUBLICATIONS

Office action dated Jul. 17, 2013 from corresponding Korean Patent Application No. 10-2012-0070932 and its English summary provided by the clients.

*Primary Examiner* — Burton Mullins
(74) *Attorney, Agent, or Firm* — LRK Patent Law Firm

(57) ABSTRACT

A linear vibration motor includes a stator part including a case having an internal space formed in the case, a bracket coupled to the case to close the internal space, and at least a magnet provided in the internal space, a vibrator part provided in the internal space, including a coil positioned so as to face the magnet and a printed circuit board having one end coupled to the bracket and the other end coupled to the coil, and an elastic member connecting the stator part and the vibrator part to each other.

19 Claims, 3 Drawing Sheets

LINEAR VIBRATION MOTOR WITH PROTRUSION BLOCKING SOLDER ATTACHING PRINTED CIRCUIT BOARD TO CASE

CROSS REFERENCE TO RELATED APPLICATION

This application claims the benefit of Korean Patent Application No. 10-2012-0070932, filed on Jun. 29, 2012, entitled "Linear Vibration Motor", which is hereby incorporated by reference in its entirety into this application.

BACKGROUND OF THE INVENTION

1. Technical Field

The present invention relates to a linear vibration motor.

2. Description of the Related Art

A vibration function of feeding-back call reception, call transmission, a key input state, or the like, to a user of a portable phone is an essential function of the portable phone. In order to implement this vibration function, a coin type/bar type vibration motor and a linear vibration motor have been mainly used. In the past, a function of simply feeding-back only the call reception has been used. However, in a current touch-type smart phone, as the vibration function has been used in an application such as a messenger, a game, or the like, a long lifespan and a fast response time have been required. In order to satisfy these requirements, most of the smart phones currently use the linear vibration motor.

The linear vibration motor is basically an actuator designed so that a weight and a spring structure supporting the weight have a specific resonance frequency and is driven by interaction between permanent magnets by receiving sine power approximate to the resonance frequency to a winding coil type electromagnet. The linear vibration motor should secure an internally sufficient space in which the weight may move to thereby be accelerated in order to maximize vibration force and be designed to have an externally slim size capable of satisfying the demand of customers (terminal manufacturers) for slimness.

Further, in order to stably apply power to a vibrator part, a printed circuit board should be fixed to a bracket. However, in a linear vibration motor according to the prior art including the following Related Art Document, in the case in which soldering is performed or a bonding material is applied in order to fix the printed circuit board to the bracket, a soldering flux or the bonding material is introduced into the vibrator part by a capillary phenomenon. In addition, a lift phenomenon is generated by the introduced flux or bonding material, such that touch sound of the vibrator part, that is, noise is generated.

PRIOR ART DOCUMENT

Patent Document (Patent Document 1) US2005-0184601 A

SUMMARY OF THE INVENTION

The present invention has been made in an effort to provide a linear vibration motor capable of preventing generation of touch sound of a vibrator part in advance by forming a coupling hole on a bracket at an outer portion of a case of the linear vibration motor so as to face a printed circuit board and forming a blocking protrusion part protruding toward the printed circuit board on the bracket at a side of the case adjacent to the coupling hole to block introduction of a flux and a bonding material into the vibrator part which is an inner portion of the case.

Further, the present invention has been made in an effort to provide a linear vibration motor capable of preventing generation of touch sound of a vibrator part in advance by forming a coupling hole on a bracket at an outer portion of a case of the linear vibration motor so as to face a printed circuit board and forming a blocking protrusion part protruding toward the bracket on the printed circuit board at a side of the case adjacent to the coupling hole to block introduction of a flux and a bonding material into the vibrator part which is an inner portion of the case.

According to a preferred embodiment of the present invention, there is provided a linear vibration motor including: a stator part including an internal space formed therein and a magnet mounted therein; a vibrator part including a coil positioned so as to face the magnet and received in the internal space of the stator part; and an elastic member connecting the stator part and the vibrator part to each other, wherein the vibrator part includes a printed circuit board having one end coupled to the stator part and the other end coupled to the vibrator part, and the stator part includes a case covering the vibrator part and the elastic member and a bracket coupled to the case so as to close the internal space of the case, the bracket including a coupling hole formed therein so as to face the printed circuit board at an outer portion of the case and a blocking protrusion part formed at a side of the case adjacent to the coupling hole and protruding toward the printed circuit board.

The magnet may be mounted on any one or both of the case and the bracket.

The stator part may further include a damping member mounted on at least one of one surface of the case facing the elastic member and one surface of the bracket facing the printed circuit board.

The magnet may include a plate yoke coupled to one surface thereof.

The vibrator part may further include a weight body moving together with the coil.

The weight body may be installed with a yoke, and the elastic member may have one end coupled to the stator part and the other end coupled to the yoke.

The elastic member may have one end coupled to the case and the other end coupled to the coil.

The printed circuit board may include: a coupling plate fixed to the bracket; an elastic part extended from the coupling plate in a spiral direction so as to have elastic force; and a contact part provided at an end portion of the elastic part and coupled to the coil to apply external power.

According to another preferred embodiment of the present invention, there is provided a linear vibration motor including: a stator part including an internal space formed therein and a magnet mounted therein; a vibrator part including a coil positioned so as to face the magnet and received in the internal space of the stator part; and an elastic member connecting the stator part and the vibrator part to each other, wherein the vibrator part includes a printed circuit board having one end coupled to the stator part and the other end coupled to the vibrator part, and the stator part includes a case covering the vibrator part and the elastic member and a coupling hole formed therein so as to face the printed circuit board at an outer portion of the case, the printed circuit board including a blocking protrusion part formed at a side of the case adjacent to the coupling hole and protruding toward the stator part.

The case may have the internal space and an opened lower portion that are formed so as to receive the stator part, the stator part may include a bracket coupled to the case so as to close the internal space of the case part, the coupling hole may be formed in the bracket, and the blocking protrusion part of the printed circuit board may protrude toward the bracket.

The magnet may be mounted on any one or both of the case and the bracket.

The stator part may further include a damping member mounted on one surface of the case facing the elastic member.

The stator part may further include a damping member mounted on one surface of the bracket facing the printed circuit board.

The magnet may include a plate yoke coupled to one surface thereof.

The vibrator part may further include a weight body moving together with the coil.

The weight body may be installed with a yoke, and the elastic member may have one end coupled to stator part and the other end coupled to the yoke.

The elastic member may have one end coupled to the case and the other end coupled to the coil.

The printed circuit board may include: a coupling plate fixed to the stator part; an elastic part extended from the coupling plate in a spiral direction so as to have elastic force; and a contact part provided at an end portion of the elastic part and coupled to the coil to apply external power.

The magnets may include a first magnet coupled to one surface of the bracket and a second magnet facing the first magnet and coupled to one surface of the case.

The linear vibration motor may further include a plate yoke coupled to one surface of the first magnet or one surface of the second magnet.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
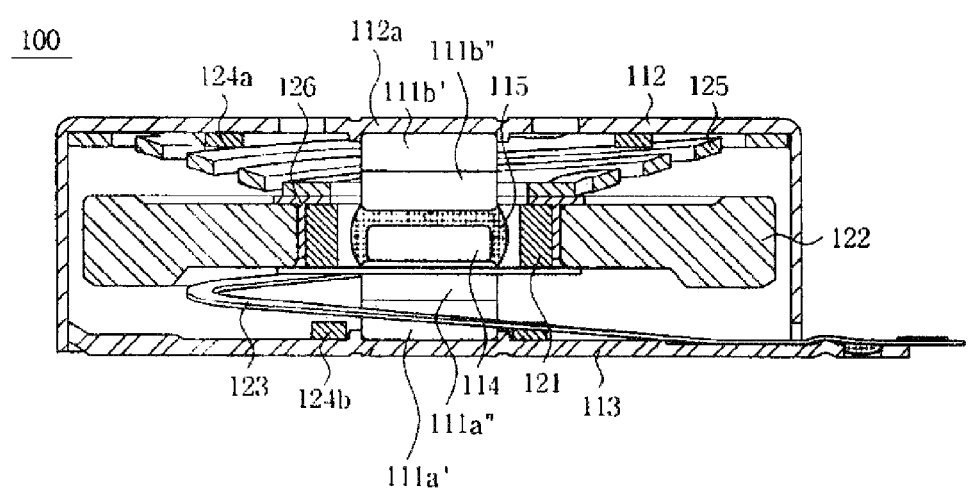
FIG. 1 is a schematic cross-sectional view of a linear vibration motor according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
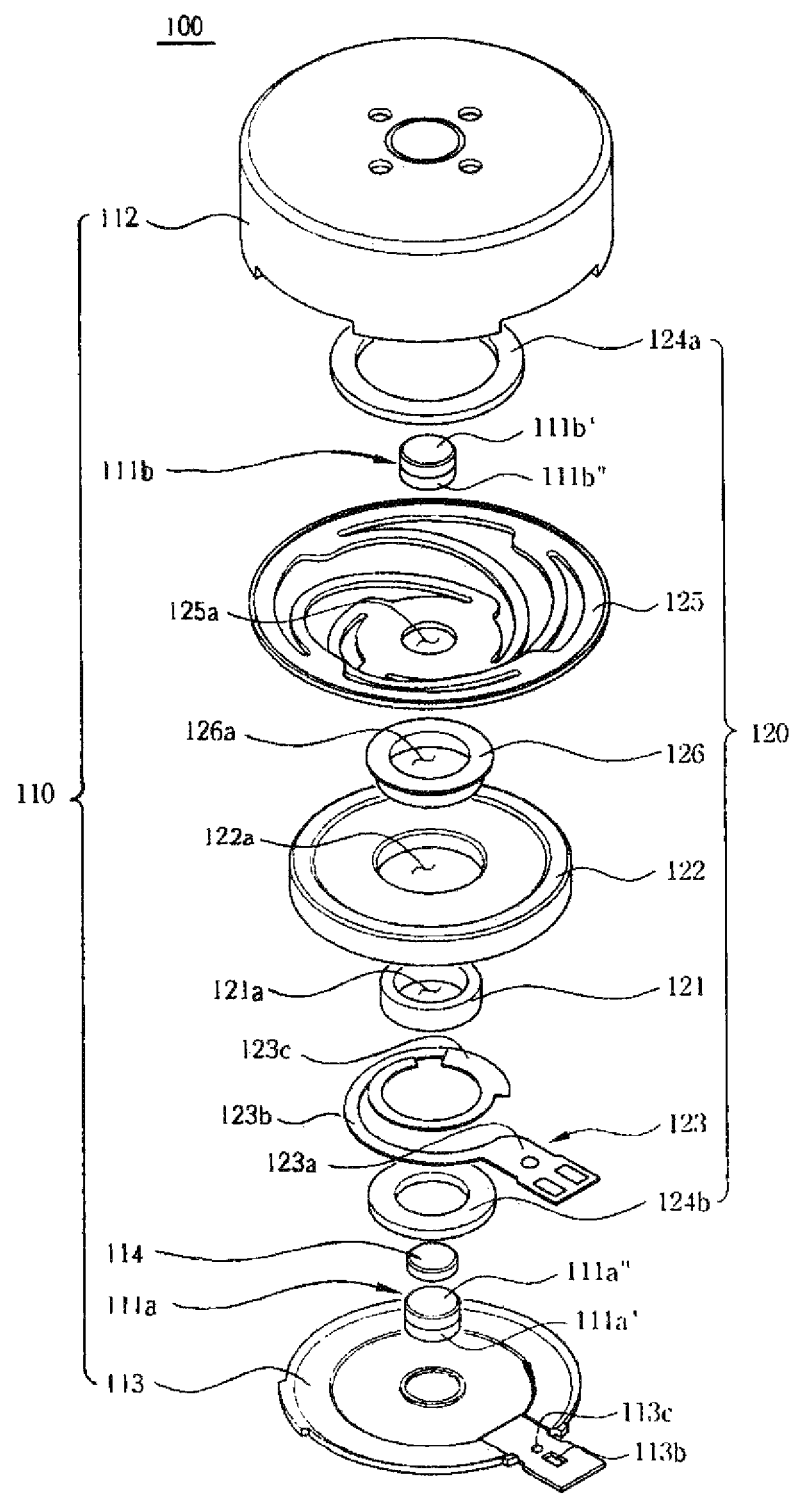
FIG. 2 is a schematic exploded perspective view of the linear vibration motor shown in FIG. 1.

FIG. 1 is a schematic cross-sectional view of a linear vibration motor according to a preferred embodiment of the present invention; and FIG. 2 is a schematic exploded perspective view of the linear vibration motor shown in FIG. 1.

As shown in FIGS. 1 and 2, the linear vibration motor 100 is configured to include a stator part 110 and a vibrator part 120, wherein the stator part 110 includes magnets 111a and 111b, a case 112, a bracket 113, and a plate yoke 114, and the vibrator part 120 includes a coil 121, a weight body 122, a printed circuit board 123, damping members 124a and 124b, an elastic member 125, and a cylindrical yoke 126.

More specifically, the case 112, which belongs to the stator part 110, includes an internal space formed therein so as to cover the vibrator part and is coupled to the bracket 113. In addition, the bracket 113 includes the printed circuit board 123 fixedly coupled thereto.

In addition, the magnets 111a and 111b include a first magnet 111a coupled to an upper surface of an inner portion of the bracket 113 facing the weight body and a second magnet 111b coupled to an upper surface of an inner portion of the case facing the first magnet.

Further, the first and second magnets 111a and 111b may be configured so that surfaces thereof facing each other have the same polarity in order to increase magnetic efficiency. That is, the first magnet 111a includes an S pole 111a' and an N pole 111a" which are two poles having different polarities, and the second magnets 111b includes an S pole 111b' and an N pole 111b" which are two poles having different polarities, wherein the N pole 111a" and the N pole 111b" are disposed to face each other.

In addition, the case 112 and the bracket 113 may be provided with seat parts 112a and 113a, respectively, in order to couple the magnets 111a and 111b to central portions thereof.

Further, the plate yoke 114 is selectively coupled to an upper portion of the first magnet 111a or a lower portion of the second magnet 111b.

Furthermore, a magnetic fluid 115 may be applied so as to cover the plate yoke 114 and the magnet facing the plate yoke 114.

In addition, the coil 121, which belongs to the vibrator part 120, is disposed to face the magnets 111a and 111b, the weight body 122 is coupled to the coil 121, and the printed circuit board 123 has one end coupled to the coil 121 and the other end coupled to the bracket 113. In addition, the elastic member 125 has one end coupled to the case 112 and the other end coupled to the coil 121.

Further, the damping member 124a is mounted on one surface of the case 112 facing the elastic member 125.

Furthermore, the printed circuit board 123 includes a coupling plate 123a fixedly coupled to the bracket, an elastic part 123b extended from the coupling plate 123a in a spiral direction so as to have elastic force, and a contact part 123c provided at an end portion of the elastic part 123b and coupled to the coil to apply external power.

In addition, the coupling plate 123a of the printed circuit board 123 is provided with a fixing groove to be fixed to the bracket 113, and the bracket 113 is provided with a fixing protrusion corresponding to the fixing groove. Further, the contact part 123c of the printed circuit board may have a disk shape so as to correspond to a shape and a size of the coil, which is a contact object.

In addition, the damping member 124b is mounted on one surface of the bracket facing the printed circuit board 123.

Through the above-mentioned configuration, the printed circuit board 123 is extended in the spiral direction while enclosing an outer side of the first magnet 111a so as to receive the first magnet 111a therein to be coupled to the coil 121, thereby elastically supporting the vibrator part 120 at a lower portion of the vibrator part 120.

To this end, the printed circuit board 123 may have a spring shape or a coil spring shape in which it is extended in the spiral direction.

In addition, the cylindrical yoke 126 is coupled between the coil 121 and the weight body 122 in order to increase a magnetic flux of the magnet. Further, the cylindrical yoke 126 may be coupled to an upper portion of the weight body 122 and be fitted into a hollow part 122a of the weight body.

In addition, the elastic member 125 is coupled to the coil 121 and the weight body 122 through the cylindrical yoke 126.

Further, the weight body 122 includes the hollow part 122a formed therein, wherein the hollow part 122a receives the cylindrical yoke 126 and the coil 121 therein and allows linear movement to be performed in a state in which the magnets 111a and 111b and the plate yoke 114 are contained therein.

In addition, each of the elastic member 125, the cylindrical yoke 126, and the coil 121 includes hollow parts 125a, 126a, and 121a formed therein so that the linear movement may be performed in a state in which the magnets 111a and 111b and the plate yoke 114 are contained therein.

Further, the printed circuit board 123 according to the preferred embodiment of the present invention may be a flexible printed circuit (FPC) having elasticity.

Through the above-mentioned configuration, when the external power is supplied to the coil 121 through the printed circuit board 123, the vibrator part linearly vibrates by electromagnetic force between the coil 111 and the first and second magnets 111a and 111b. Here, when a displacement of the vibrator part 120 increases, friction due to a contact between the elastic member 125 and the weight body 122 is blocked by the damping member 124, thereby making it possible to decrease metallic high frequency noise and increase a degree of freedom in a design through space utilization.

Hereinafter, a coupling part between the printed circuit board and the bracket will be described in detail.

Figure 3:
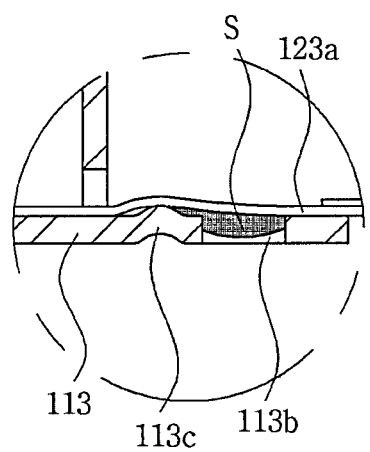
FIG. 3 is a cross-sectional view showing an example of a coupling part between a printed circuit board and a bracket in the linear vibration motor shown in FIG. 1.

FIG. 3 is a cross-sectional view showing an example of a coupling part between the printed circuit board and the bracket in the linear vibration motor shown in FIG. 1.

As shown in FIG. 3, the bracket 113 includes a coupling hole 113b formed so as to face the printed circuit board 123, at an outer portion of the case. In addition, the bracket 113 includes a blocking protrusion part 113c formed at a side of the case adjacent to the coupling hole 113b.

Through the above-mentioned configuration, in the case of soldering the coupling plate 123a of the printed circuit board 123 to the coupling hole 113b of the bracket 113 in order to couple the coupling plate 123a of the printed circuit board 123 to the bracket 113, introduction of a soldering flux S into the case is blocked by the blocking protrusion part 113c of the bracket.

In addition, in the case of applying a bonding material to the coupling hole 113b of the bracket 113, introduction of the bonding material into the case is blocked by the blocking protrusion part 113c of the bracket.

Therefore, a lift phenomenon of the printed circuit board due to the introduction of the soldering flux into the case may be prevented in advance, and the generation of noise such as touch sound, or the like, may be prevented in advance by close adhesion between the bracket and the printed circuit board.

Figure 4:
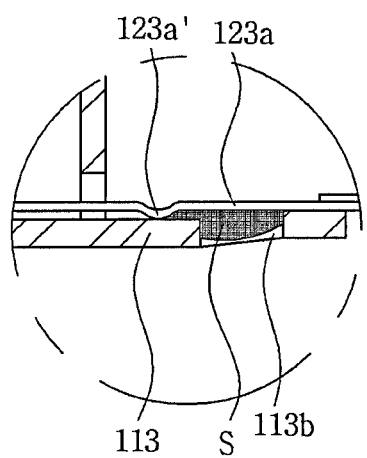
FIG. 4 is a cross-sectional view showing another example of the coupling part between the printed circuit board and the bracket in the linear vibration motor shown in FIG. 1.

FIG. 4 is a cross-sectional view showing another example of the coupling part between the printed circuit board and the bracket in the linear vibration motor shown in FIG. 1. As shown in FIG. 4, the bracket 113 includes a coupling hole 113b formed so as to face the coupling plate 123a of the printed circuit board 123, at the outer portion of the case.

In addition, the printed circuit board 123 includes a blocking protrusion part 123a' formed at a side of the case adjacent to the coupling hole 113b.

Through the above-mentioned configuration, in the case of soldering the coupling plate 123a of the printed circuit board 123 to the coupling hole 113b of the bracket 113 in order to couple the coupling plate 123a of the printed circuit board 123 to the bracket 113, introduction of a soldering flux S into the case is blocked by the blocking protrusion part 123a' formed on the coupling plate 123a of the printed circuit board 123.

In addition, in the case of applying a bonding material to the coupling hole 113b of the bracket 113, introduction of the bonding material into the case is blocked by the blocking protrusion part 123a' of the printed circuit board.

Therefore, a lift phenomenon of the printed circuit board due to the introduction of the soldering flux into the case may be prevented in advance, and the generation of noise such as touch sound, or the like, may be prevented in advance by close adhesion between the bracket and the printed circuit board.

In addition, the linear vibration motor according to the preferred embodiment of the present invention may further include a coating tape and a coating layer adhered to the blocking protrusion part to secondarily block the introduction of the soldering flux or the bonding material.

As set forth above, according to the preferred embodiment of the present invention, the linear vibration motor capable of preventing the generation of the touch sound of the vibrator part in advance by blocking the introduction the flux and the bonding material into the vibrator part which is the inner portion of the case may be obtained.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:
1. A linear vibration motor comprising:
   a stator part including a case having an internal space formed therein, a bracket coupled to the case to close the internal space, and at least a magnet provided in the internal space;
   a vibrator part provided in the internal space, including a coil positioned so as to face the magnet and a printed circuit board having one end coupled to the bracket and another end coupled to the coil; and an elastic member connecting the stator part and the vibrator part to each other, wherein the bracket includes a coupling hole formed therein at an outer portion of the case and a blocking protrusion part formed adjacent to the coupling hole at an outer portion of the case and protruding toward the printed circuit board, and the printed circuit board and the bracket are attached, to each other by either soldering or applying a bonding material.

2. The linear vibration motor as set forth in claim 1, wherein the magnet is mounted on either one or both of the case and the bracket.

3. The linear vibration motor as set forth in claim 1, wherein the stator part further includes a damping member mounted on at least one of one surface of the case facing the elastic member and one surface of the bracket facing the printed circuit board.

4. The linear vibration motor as set forth in claim 1, wherein the magnet includes a plate yoke coupled to one surface of the magnet.

5. The linear vibration motor as set forth in claim 1, wherein the vibrator part further includes a weight body moving together with the coil.

6. The linear vibration motor as set forth in claim 5, wherein the weight body is coupled with a yoke, and the elastic member has one end coupled to the stator part and another end coupled to the yoke.

7. The linear vibration motor as set forth in claim 6, wherein the elastic member has one end coupled to the case and another end coupled to the coil.

8. The linear vibration motor as set forth in claim 1, wherein the printed circuit board includes:

a coupling plate fixed to the bracket;

an elastic part extended from the coupling plate in a spiral direction so as to have elastic force; and a contact part provided at an end portion of the elastic part and coupled to the coil to apply external power.

9. A linear vibration motor comprising:

a stator part including a case having an internal space formed therein, a bracket coupled to the case to close the internal space of the case, and at least a magnet provided in the internal space;

a vibrator part provided in the internal space, including a coil positioned so as to face the magnet and a printed circuit board having one end coupled to the bracket and another end coupled to the coil; and an elastic member connecting the stator part and the vibrator part to each other, wherein the bracket includes a coupling hole formed therein at an outer portion of the case, the printed circuit board and the bracket are attached to each other by either soldering or applying a bonding material, and the printed circuit board including a blocking protrusion part formed adjacent to the coupling hole at an outer portion of the case and protruding toward the bracket.

10. The linear vibration motor as set forth in claim 9, wherein the magnet is mounted on either one or both of the case and the bracket.

11. The linear vibration motor as set forth in claim 9, wherein the stator part further includes a damping member mounted on one surface of the case facing the elastic member.

12. The linear vibration motor as set forth in claim 9, wherein the stator part further includes a damping member mounted on one surface of the bracket facing the printed circuit board.

13. The linear vibration motor as set forth in claim 9, wherein the magnet includes a plate yoke coupled to one surface of the magnet.

14. The linear vibration motor as set forth in claim 9, wherein the vibrator part further includes a weight body moving together with the coil.

15. The linear vibration motor as set forth in claim 14, wherein the weight body is coupled with a yoke, and the elastic member has one end coupled to stator part and another end coupled to the yoke.

16. The linear vibration motor as set forth in claim 9, wherein the elastic member has one end coupled to the case and another end coupled to the coil.

17. The linear vibration motor as set forth in claim 9, wherein the printed circuit board includes:

a coupling plate fixed to the stator part;

an elastic part extended from the coupling plate in a spiral direction so as to have elastic force; and a contact part provided at an end portion of the elastic part and coupled to the coil to apply external power.

18. The linear vibration motor as set forth in claim 9, wherein the magnets include a first magnet coupled to one surface of the bracket and a second magnet facing the first magnet and coupled to one surface of the case.

19. The linear vibration motor as set forth in claim 18 further comprising a plate yoke coupled to one surface of the first magnet or one surface of the second magnet.

* * * * *